United States Patent
Tanaka

(10) Patent No.: US 7,657,681 B2
(45) Date of Patent: Feb. 2, 2010

(54) ARBITRATION CIRCUIT AND FUNCTION PROCESSING CIRCUIT PROVIDED THEREIN

(75) Inventor: Kazuhisa Tanaka, Osaka (JP)

(73) Assignee: Panasonic Corporation, Osaka (JP)

( * ) Notice: Subject to any disclaimer, the term of this patent is extended or adjusted under 35 U.S.C. 154(b) by 799 days.

(21) Appl. No.: 10/979,223

(22) Filed: Nov. 3, 2004

(65) Prior Publication Data

US 2005/0097281 A1    May 5, 2005

(30) Foreign Application Priority Data

Nov. 5, 2003    (JP) .............................. 2003-375669

(51) Int. Cl.
  *G06F 12/00*    (2006.01)
  *G06F 9/46*    (2006.01)
  *G06F 11/00*    (2006.01)
(52) U.S. Cl. .................. 710/240; 710/29; 710/309; 718/102; 718/103; 714/12
(58) Field of Classification Search .................. 710/29, 710/309, 240–244
  See application file for complete search history.

(56) References Cited

U.S. PATENT DOCUMENTS

| | | | |
|---|---|---|---|
| 4,270,167 A | | 5/1981 | Koehler et al. |
| 5,263,146 A | * | 11/1993 | Mishima .................... 711/163 |
| 5,285,528 A | * | 2/1994 | Hart .......................... 710/200 |
| 5,623,607 A | * | 4/1997 | Kodama et al. ............... 710/29 |
| 6,006,303 A | * | 12/1999 | Barnaby et al. ............. 710/244 |
| 6,397,359 B1 | * | 5/2002 | Chandra et al. ............. 714/712 |
| 6,499,031 B1 | * | 12/2002 | Hopmann et al. .............. 707/8 |
| 6,606,691 B2 | * | 8/2003 | Didier et al. ................ 711/151 |
| 6,625,678 B1 | | 9/2003 | Koguchi |
| 7,093,256 B2 | * | 8/2006 | Bloks ........................ 718/102 |

FOREIGN PATENT DOCUMENTS

| | | |
|---|---|---|
| JP | 1-124051 | 5/1989 |
| JP | 2001-236301 | 8/2001 |
| JP | 2001-243676 | 9/2001 |

* cited by examiner

*Primary Examiner*—Mark Rinehart
*Assistant Examiner*—Brian T Misiura
(74) *Attorney, Agent, or Firm*—McDermott Will & Emery LLP

(57) ABSTRACT

In an arbitration circuit in which a shared circuit such as a memory is used exclusively by one of a plurality of functional blocks at a time, an access reservation request is issued from one of the functional blocks, and the access request associated with the access reservation request is reserved. Thereafter, when an access request is issued from another functional block, it is determined which one of the access reservation request and the access request from these functional blocks takes precedence. For example, if the access request from the latter functional block has a low priority level, the access reservation request is selected and the circuit waits for an access request from the functional block which has issued this access reservation request. In this manner, it is possible to avoid cancellation of a once-accepted access request and waiting for a high-priority access request.

19 Claims, 6 Drawing Sheets

US 7,657,681 B2

ARBITRATION CIRCUIT AND FUNCTION PROCESSING CIRCUIT PROVIDED THEREIN

The disclosure of Japanese Patent Application No. 2003-375669 filed on Nov. 5, 2003 including specification, drawings and claims is incorporated herein by reference in its entirety.

BACKGROUND OF THE INVENTION

The present invention relates to an arbitration circuit for arbitration, in using a shared circuit such as a memory, between functional blocks in a circuit such as a digital circuit in which the shared circuit is used exclusively by one of the functional blocks at a time.

Digital circuits that process various data often use memories so as to temporally store data. If a large number of circuits requiring memories (hereinafter, referred to as functional blocks) are provided, the memories are prepared for the respective functional blocks in some cases. However, to implement the same capacity, in both cases of implementation in LSI and on a board, provision of a smaller number of large-capacity memories is more advantageous than provision of a large number of small-capacity memories in terms of, for example, cost, implementation area and the number of mounting steps. In view of this, a minimum number of memories corresponding to the total capacity necessary for the functional blocks are generally provided to be shared among the functional blocks.

However, only a small number (one or two) of inputs/outputs are generally provided to read/write (hereinafter, collectively referred to as access) data stored in memories. To access different data sets in the memories from functional blocks at respective timings independently, operation of permitting access to the memories without contradiction and interruption by adjusting requests for access from the functional blocks is needed. Hereinafter, this operation will be referred to as arbitration. A circuit for implementing the arbitration will be hereinafter referred to as an arbitration circuit.

In recent years, semiconductors have been advanced remarkably, and the speed of internal circuits has increased to the order of several hundreds of MHz to several hundreds of GHz. In addition, the semiconductors come to be used in system LSI (i.e., are integrated), so that a memory is shared among a larger number of circuits. The amount of data has also rapidly increased accordingly.

On the other hand, memories have also been advanced, but the operation frequencies thereof are still in the range of 200 to 400 MHz. That is, the memories have not been advanced as rapidly as semiconductors. A large number of semiconductors include function cores which require memories, so that the memories and their peripheral components tend to degrade the performance of a system. Therefore, effective use of memories is necessary to enhance the performance of the system, and an arbitration circuit such as the above-described digital circuit plays an importance role.

To estimate the performance of a memory, two points of views are considered. One is the bandwidth and the other is the latency. The former is the upper limit of the average amount of data in access in normal operation. In theory, this upper limit is determined by the data width in a memory, the clock frequency and overhead of memory access. The total access amount necessary for the functional blocks needs to be determined not to exceed the bandwidth. The latter is the time during which when a plurality of access requests are issued at the same time, an unselected request is kept waiting before being actually accepted. The latency occurs when the amount of data used in access is smaller than the bandwidth in average but a plurality of access requests are issued at a time with low-priority access requests kept waiting. In a system performing real-time processing, the latency might cause serious troubles, and thus careful consideration is needed to prevent the latency from causing serious troubles.

In view of this, an arbitration circuit satisfying the foregoing requirements is needed. For arbitration, allocation of priority levels and a round-robin scheme are generally adopted. The priority levels are used to indicate which access request is to take precedence when a plurality of access requests are issued at the same time. These access requests are accepted in order of descending priority. However, if the processing is always performed in this manner, access requests with relatively low priority levels might be left unexecuted for a long time. Therefore, a scheme with which if an access request, even a high-priority access request, is once accepted, the priority level thereof is temporally lowered based on a criterion so that a lower-priority access request is accepted during a given period of time, is often adopted. This scheme is called a round-robin scheme.

In this way, in a conventional technique (e.g., Japanese Unexamined Patent Publication No. 1-124051), when a plurality of access requests are issued at the same time, arbitration is performed in accordance with priority levels based on a history of accepted accesses.

Functional blocks configured to use a shared memory generally operate independently of each other, so that access requests to the shared memory from these functional blocks might coincide with each other. Even if this possibility of the coincidence is extremely low, failure of the system should be prevented as long as the possibility exists.

In the above-mentioned conventional technique, access requests are issued with no advance notice, and thus an arbitration circuit needs to perform arbitration at every issue. If an access request which does not have such a high priority level but is for access in a long period is issued and, immediately after the request is accepted, a high-priority request is issued, the request immediately before the acceptance is forced to be canceled or interrupted, or subsequent high-priority requests are forced to be kept waiting, for example. The former might cause overhead or degradation in performance, and the latter might cause failure of a system.

To avoid these problems by using the conventional technique, cancellation or latency is estimated with a margin and a circuit for the margin is additionally prepared. This increases costs for LSI and memories.

SUMMARY OF THE INVENTION

It is therefore an object of the present invention to efficiently arbitrate a plurality of access requests without canceling an access request once accepted or keeping high-priority access requests waiting.

In order to achieve this object, according to the present invention, a technique of using access reservation requests is introduced in addition to access requests from functional blocks. As subsequent access requests can be known by the reservation requests, arbitration and determination are performed with the highest efficiency.

In addition, introduction of an effective period of reservation, automatic periodic reservation using an interval timer, control for changing the order of priority by monitoring the access frequency are adopted, for example. In this way, the peak required performance is reduced, thereby satisfying specifications with minimum hardware resources.

Specifically, an inventive arbitration circuit includes: a plurality of function processing circuits; a shared circuit shared among the function processing circuits; and a shared-circuit-use-arbitrating circuit, wherein the shared circuit is used exclusively by one of the function processing circuits at a time, each of the function processing circuits issues a use request to use the shared circuit and also issues a use reservation request prior to the use request, and the shared-circuit-use-arbitrating circuit receives the use requests and the use reservation requests from the function processing circuits and arbitrates preference between a use request from one of the function processing circuits and a use reservation request from another function processing circuit.

In the arbitration circuit, the shared-circuit-use-arbitrating circuit may include an information holding circuit for holding the use requests and the use reservation requests.

In this case, the information holding circuit preferably holds the use requests and the use reservation requests from the function processing circuits and a history of arbitration.

In the arbitration circuit, each of the function processing circuits issuing the use reservation request may have a function of issuing cancellation of the use reservation request to the shared-circuit-use-arbitrating circuit when the use reservation becomes unnecessary.

In the arbitration circuit, the shared-circuit-use-arbitrating circuit may include a timer for measuring a period elapsed after the use reservation request has been accepted.

In this case, if the period elapsed after the use reservation request has been accepted is longer than a predetermined period, the shared-circuit-use-arbitrating circuit preferably cancels the use reservation request.

In such a case, the predetermined period from the issue of the use reservation request to the cancellation of the use reservation request is preferably changeable.

In the arbitration circuit, each of the function processing circuits issuing the use reservation request may issue, to the shared-circuit-use-arbitrating circuit, information on at least one of a predetermined use time, a predetermined use period, a usage method and an amount of use with respect to the shared circuit, together with the use reservation request, and the shared-circuit-use-arbitrating circuit may perform arbitration based on the information from the function processing circuit issuing the use reservation request.

In the arbitration circuit, when one of the function processing circuits sporadically issues the use request, the shared-circuit-use-arbitrating circuit may permit said one of the function processing circuits to use the shared circuit with limitations imposed on at least one of a function to be used, a usage method and a use period.

In the arbitration circuit, the shared-circuit-use-arbitrating circuit may include an automatic reservation issuing circuit for automatically issuing a use reservation at established periods for one of the function processing circuits periodically using the shared circuit.

In the arbitration circuit, the shared-circuit-use-arbitrating circuit may include an arbitration preference changing circuit for changing, with time, preference in arbitration for permitting the use of the shared circuit.

In the arbitration circuit, each of the function processing circuits may issue an urgent use request to the shared-circuit-use-arbitrating circuit when the function processing circuit needs to use the shared circuit immediately, and when the shared-circuit-use-arbitrating circuit accepts the urgent use request from one of the function processing circuits, the shared-circuit-use-arbitrating circuit may determine an order of using the shared circuit, a period during which the shared circuit is used and a function to be used for the shared circuit and notifies said one of the function processing circuits of the determined order, period and function.

In the arbitration circuit, the shared circuit may be a memory.

In the arbitration circuit, each of the function processing circuits may include a state machine and issues the use reservation request when the state machine enters a state immediately before the issue of the use request.

In the arbitration circuit, at least one of the function processing circuits may include a data buffer and has a function of outputting data from the data buffer, and the function processing circuit having the function of outputting data may issue the use reservation request immediately before the data stored in the data buffer reaches a maximum.

In the arbitration circuit, at least one of the function processing circuits may include a data buffer and has a function of inputting data to the data buffer from the outside, and the function processing circuit having the function of inputting data may issue the use reservation request immediately before all the data stored in the data buffer is output.

An inventive function processing circuit is included in a plurality of function processing circuits using a shared circuit, the shared circuit is used exclusively by one of the function processing circuits at a time, and each of the function processing circuits issues a use request to use the shared circuit and also issues a use reservation request prior to the use request.

The function processing circuit may include a state machine therein, and the function processing circuit issues the use reservation request when the state machine enters a state immediately before the issue of the use request.

The function processing circuit may include a data buffer therein, and the function processing circuit may have a function of outputting data from the data buffer, and the function processing circuit may issue the use reservation request immediately before the data stored in the data buffer reaches a maximum.

The arbitration circuit may include a data buffer therein, the function processing circuit may have a function of inputting data to the data buffer from the outside, and the function processing circuit may issue the use reservation request immediately before all the data stored in the data buffer is output.

As described above, according to the present invention, in an arbitration circuit including a plurality of functional blocks, when an access reservation request is issued from a first functional block, for example, an access request associated with this access reservation request is reserved. Thereafter, when an access request is issued from a second functional block, for example, a shared-circuit-use-arbitrating circuit gives preference on either access reservation requests from the first functional block or access requests from the second functional block. If the access request from the second functional block has a low priority level or occupies the access to a memory to an extent that will hinder the access request from the first functional block, for example, the access reservation request from the first functional block is accepted preferentially, so that the access request from the second functional block is kept waiting. This enables efficient arbitration between access requests.

DESCRIPTION OF THE PREFERRED EMBODIMENTS

Hereinafter, embodiments of the present invention will be described with reference to the drawings.

Embodiment 1

Figure 1:
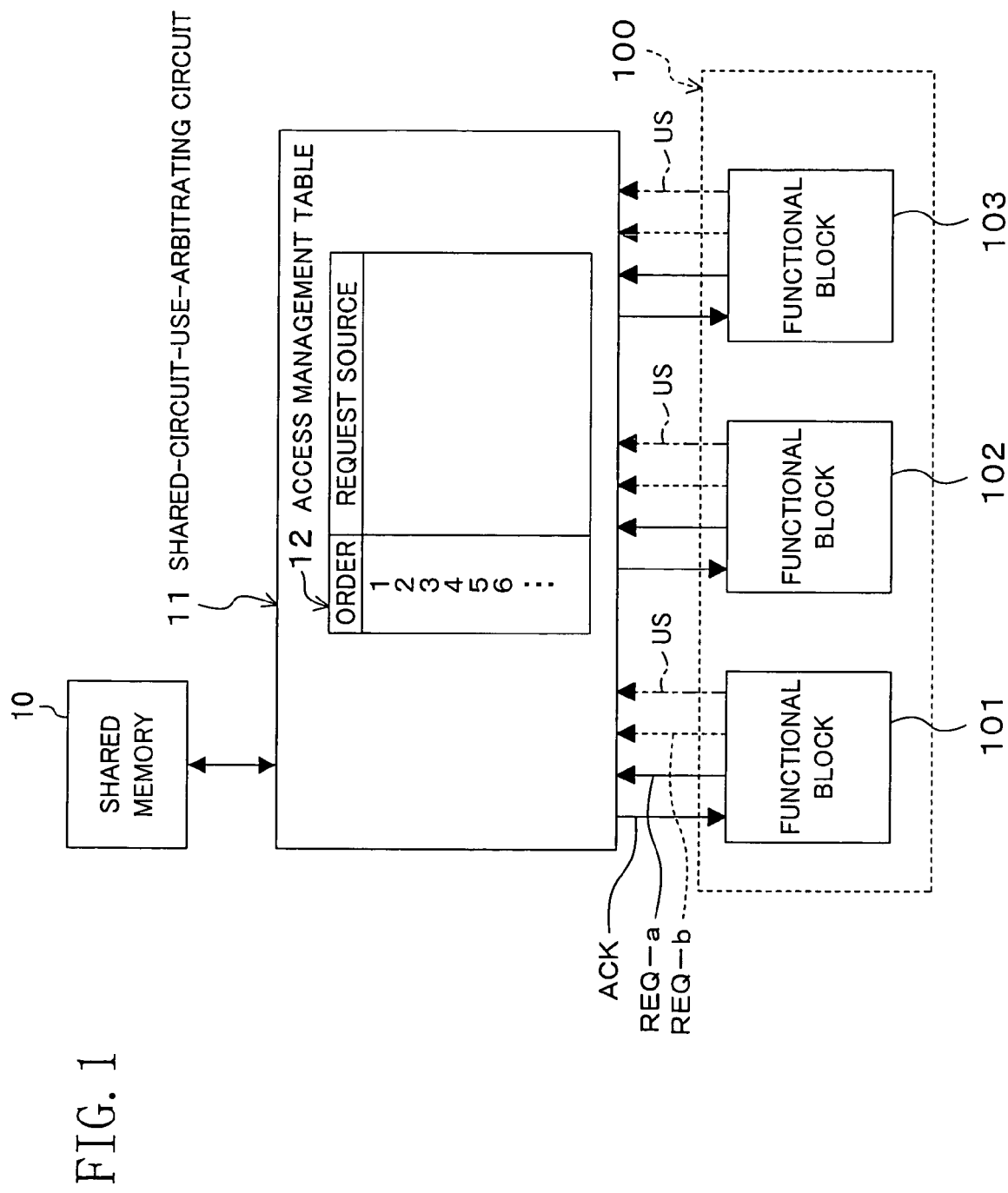
FIG. 1 is a diagram showing a configuration of an arbitration circuit according to a first embodiment of the present invention.

FIG. 1 shows an arbitration circuit in a digital circuit according to a first embodiment of the present invention. In FIG. 1, reference numerals 101, 102 and 103 respectively denote three functional blocks (function processing circuits) which need access to a shared memory (shared circuit) 10. These functional blocks are hereinafter referred to as an access requesting group 100.

Each of the three functional blocks 101 through 103 issues an access request as a request to use the shared memory 10 (hereinafter, referred to as a use request) when a given access request event to the shared memory 10 occurs. Each of the functional blocks 101 through 103 also issues an access reservation request as a request to reserve the use of the shared memory 10 (hereinafter, referred to as a use reservation request) to the shared memory 10 in advance at a stage before the issue of the access request. This access reservation request is issued when, for example, any one of the following four requirements is satisfied at the stage before the issue of the access request.

1. A state machine included in a functional block enters a state just preceding the issue of the use request.
2. A data buffer included in a functional block having a function of outputting data is close to "full".
3. A data buffer included in a functional block having a function of inputting data is close to "empty".
4. All the requirements except for one of three or more requirements for issuing a use request are satisfied.

In this manner, each of the functional blocks 101 through 103 issues an access reservation request when one of the four requirements is satisfied, and then issues a usual access request. If the period from when the reservation request is issued to when the subsequent usual access request is issued is previously known, the access reservation request is accompanied with a predetermined use time, at which the usual access request is issued.

If the given access reservation request event immediately occurs with none of the foregoing four requirements satisfied, each of the functional blocks 101 through 103 instantly issues an access request as a use request without issuing the access reservation request. This access request will be hereinafter referred to as a sporadic access request, which is distinguished from the usual access request issued after the issue of the access reservation request.

In FIG. 1, reference numeral 11 denotes a shared-circuit-use-arbitrating circuit for arbitrating access requests from the access requesting group 100 described above to issue access permission to one of the functional blocks in the access requesting group 100. Reference numeral 12 denotes an access management table (information holding circuit) provided in the shared-circuit-use-arbitrating circuit 11. The access management table 12 stores access requests from the functional blocks 101 through 103, receiving status of access reservation requests (which will be described below) and history information on arbitration. Each of the functional blocks 101 through 103 is connected to the shared-circuit-use-arbitrating circuit 11 via three request signal lines REQ-a, REQ-b and US and an acknowledged signal line ACK.

Now, an example of operation of the shared-circuit-use-arbitrating circuit 11 will be described with reference to FIG. 2, focusing on operation relating to the present invention.

Suppose an access request event occurs from the functional block 101. In this case, the functional block 101 issues a usual or sporadic access request as a request to use the shared memory 10, to the shared-circuit-use-arbitrating circuit 11 via the signal line REQ-a (step S501). The shared-circuit-use-arbitrating circuit 11 refers to request signals REQ-a and REQ-b from the other functional blocks 102 and 103 and the access management tables 12 in the current time, accepts the access request from the functional block 101 if there is no particular harm in the acceptance, and then accepts the access request from the functional block 101 via the acknowledged signal line ACK (step S502).

Then, suppose an access request event has not occurred yet but one of the above-mentioned four requirements is satisfied so that an access request event will occur soon in the functional block 102. In this case, the functional block 102 issues an access reservation request as a request to reserve the use of the shared memory 10 via the request signal line REQ-b (step S503). The shared-circuit-use-arbitrating circuit 11 accepts the access reservation request from the functional block 102. If the access reservation request is accompanied with a predetermined use time, the shared-circuit-use-arbitrating circuit 11 records and registers the access reservation request together with this predetermined use time in the access management table 12 (step S504). It should be noted that access permission is not issued because an access request has not been actually issued yet.

In this situation, an access request event occurs in the other functional block 103, and a usual or sporadic access request is issued via the signal line REQ-a (step S505). As in the case of the access request from the functional block 101, the shared-circuit-use-arbitrating circuit 11 refers to the request signals REQ-a and REQ-b from the other functional blocks 101 and 102 and the access management table 12. At this time, the access reservation request from the functional block 102 is held in the access management table 12. Accordingly, even in a case where the shared-circuit-use-arbitrating circuit 11 has received an access request from the functional block 103 first, if it is determined that a process performed by the access request from the functional block 103 is completed before the issue of a usual access request (i.e., before a predetermined use time) following the access reservation request from the functional block 102, the shared-circuit-use-arbitrating circuit 11 accepts the access request from the functional block 103 and permits access therefrom. On the other hand, in a case where access reservation request from the functional block 102 and the access request from the functional block 103 contend, the shared-circuit-use-arbitrating circuit 11 compares the priority levels of the usual or sporadic access request from the functional block 103 and the access reservation request from the functional block 102 (step S506). Then, only in a case where it is determined that an access request from the functional block 102 which is expected to be issued next is not adversely affected, the shared-circuit-use-arbitrating circuit 11 accepts the access request from the functional block 103 and permits access therefrom (step S507). Accordingly, if the priority level of the access request from the functional block 103 is low and it is determined that permission of access therefrom will occupy the memory access to an extent that will hinder the access request from the functional block 102 which is expected to be issued next, the shared-circuit-use-arbitrating circuit 11 rejects the access request from the functional block 103 and waits for the access request from the functional block 102 (step S508). In this manner, arbitration in which a subsequent access request is taken into consideration is performed, thus further optimizing access arbitration.

Although not shown, in a situation where a usual access request is issued from a functional block to the shared memory 10 and a sporadic access request is issued from another functional block, if the shared-circuit-use-arbitrating circuit 11 permits access from the functional block issuing the sporadic access request preferentially, this permission is given with limitations imposed on at least one of a function to be used, a usage method and a period of use, for example, with respect to the shared memory 10. The shared-circuit-use-arbitrating circuit 11 also can update the access management table 12 to allow the sporadic access request to be inserted as an access reservation request.

After the issue of the usual or sporadic access request to the shared memory 10, if such a situation that the entire system becomes inoperable unless this access request is not immediately accepted occurs, each of the functional blocks 101 through 103 issues an urgent access request via the signal line US. This urgent access request is for emergency use and takes precedence over the other access requests and access reservation requests. Processes based on the other access requests and access reservation requests are forced to be suspended and a process with a higher urgent level based on the urgent access request is performed at the highest priority. The processes to be suspended are processes with which the system becomes functionally abnormal by this suspension, but the process can be recovered by a microcomputer or the like. In general, LSI is designed, bearing the worst case in mind. If the possibility of the worst case is extremely low, the system that is down needs to be recovered not by performing a process which can be recovered but by suspending the system. The issue of urgent access requests from the functional blocks 101 through 103 provides a solution for recovery of such a system that is down. These urgent access requests are for emergency use, so that the urgent access requests are issued from the functional blocks 101 through 103 at limited occasions. When an urgent access request is issued, the period during which the shared memory 10 is used based on this request is limited to a minimum length so as to minimize the effects on the other functional blocks.

Upon the issue of an urgent access request from a functional block, even if an access request has been issued from another functional block, the shared-circuit-use-arbitrating circuit 11 permits access from the functional block from which the urgent access request is issued, regardless of usual criteria for arbitration. This permission is made with the order of using the shared memory 10, a period during which the shared memory 10 is used and a function to be used for the shared memory 10 determined.

Embodiment 2

Hereinafter, a shared-circuit-use-arbitrating circuit provided in an arbitration circuit according to a second embodiment of the present invention will be described.

Some arbitration circuits need to cancel access reservation requests. Methods for canceling an access reservation request includes a method with which access requests issue signals for canceling themselves to cancel the requests and a method with which an access reservation request is automatically canceled if no access request is issued within a given period after a shared-circuit-use-arbitrating circuit has received the access reservation request.

The former method is implemented in a manner in which a cancellation signal for canceling an access reservation request is issued from a functional block which can issue a cancellation to a shared-circuit-use-arbitrating circuit.

Figure 3:
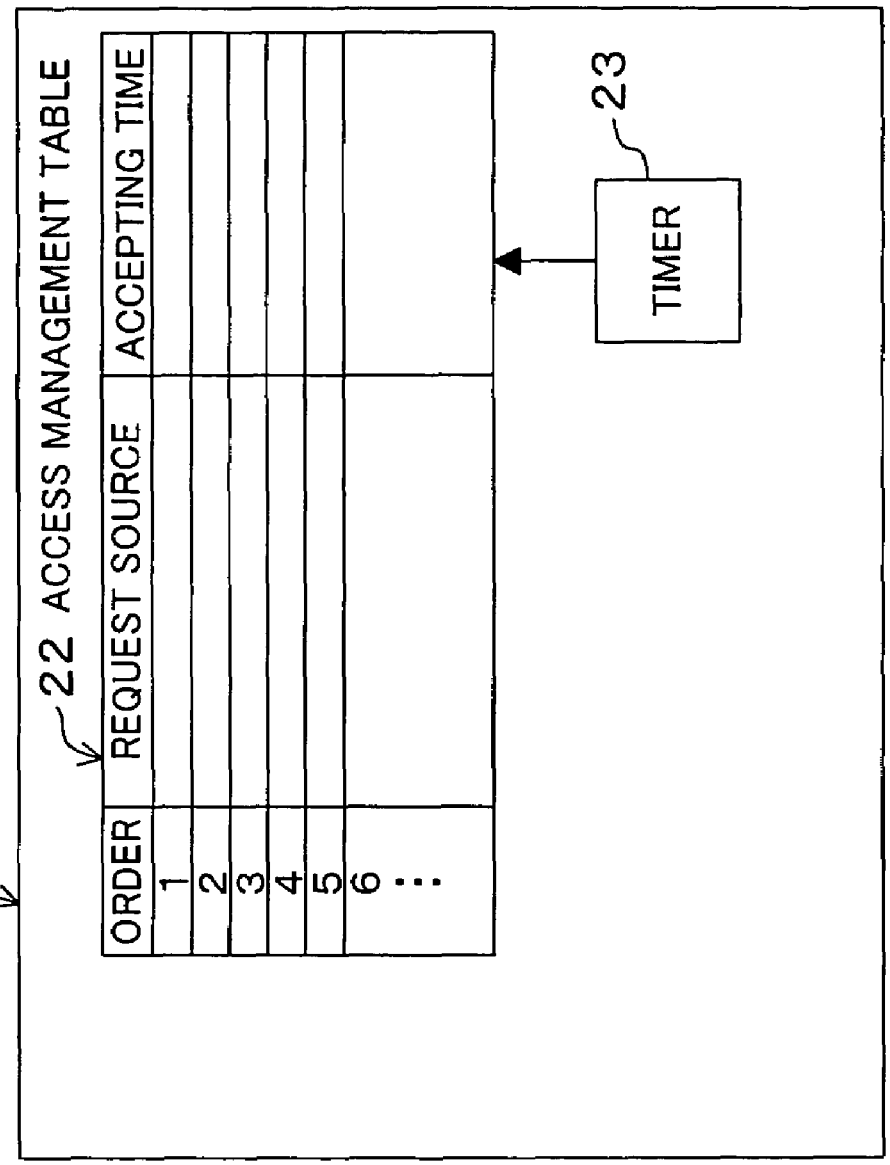
FIG. 3 shows a configuration of a shared-circuit-use-arbitrating circuit included in an arbitration circuit according to a second embodiment of the present invention.

In the latter method, as shown in FIG. 3, a shared-circuit-use-arbitrating circuit 21 includes a timer 23 so as to record, in an access management table 22, a time at which an access reservation request is accepted. When the shared-circuit-use-arbitrating circuit 21 accepts an access request from a functional block and refers to the access management table, the difference between the current time indicated by the timer 23 and access-reservation-request acceptance time recorded concurrently with the access reservation request is determined. If the difference is equal to or longer than a predetermined period, the shared-circuit-use-arbitrating circuit 21 operates as if the access reservation request is not issued.

The order of priority of access requests may be determined uniquely according to request specifications or may be determined in a programmable manner. In addition, a round-robin scheme may be used. If a period during which an access reservation request is effective, for example, is determined in a programmable manner, the shared-circuit-use-arbitrating circuit has more flexibility.

Embodiment 3

Hereinafter, an arbitration circuit according to a third embodiment of the present invention will be described.

Figure 4:
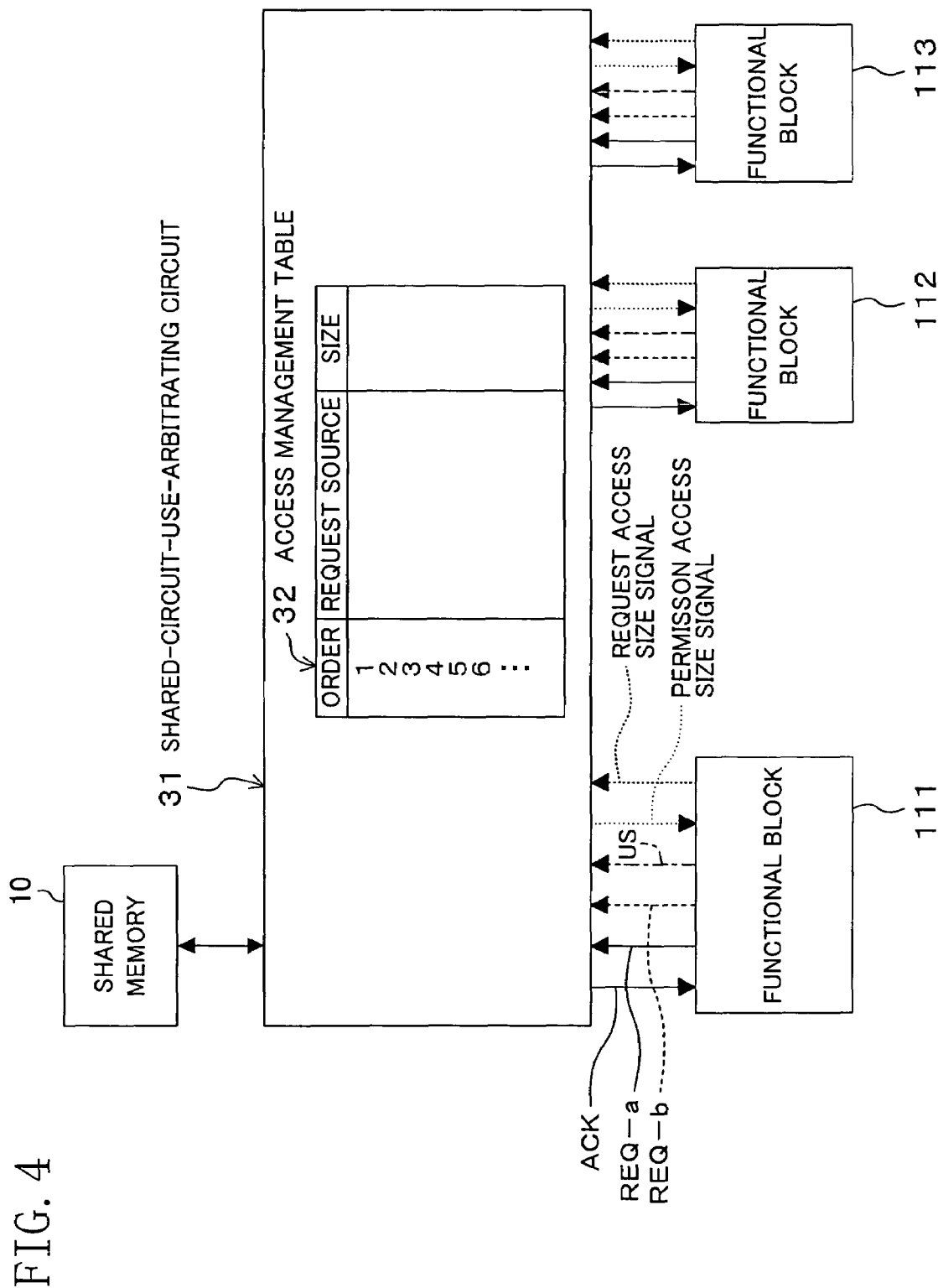
FIG. 4 is a diagram showing a configuration of an arbitration circuit according to a third embodiment of the present invention.

FIG. 4 shows the arbitration circuit of this embodiment. In this arbitration circuit, request access size signals issued from an access requesting group concurrently with the issue of access reservation requests from the access requesting group and acknowledged access size signals issued from a shared-circuit-use-arbitrating circuit 31 to the access requesting group are added between the access requesting group and the shared-circuit-use-arbitrating circuit 31, in addition to the configuration of the arbitration circuit shown in FIG. 1.

Figure 2:
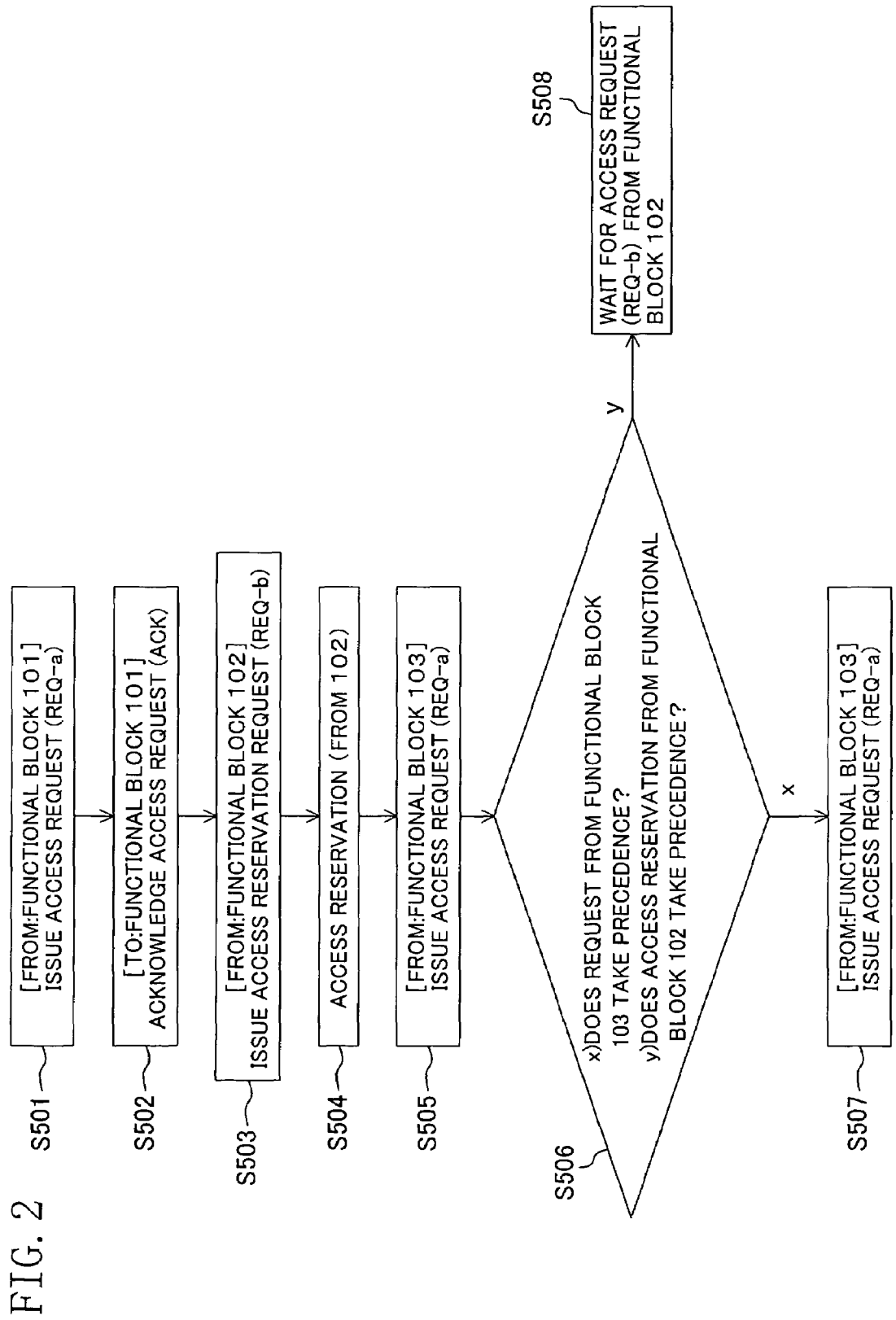
FIG. 2 is a flowchart showing operation of a shared-circuit-use-arbitrating circuit included in the arbitration circuit.

According to this embodiment, in the case of performing the same process as that shown in FIG. 2, for arbitration between access requests at step S506, the shared-circuit-use-arbitrating circuit 31 refers to the access size (the amount of data used in access). If access from a functional block 113, for example, terminates in a short period, the access from the functional block 113 is accepted, regardless of the order of priority and an access reservation request from a functional block 112. As a result, the shared memory 10 is used more efficiently as well as arbitration can be performed with higher accuracy.

In this embodiment, an access reservation request is accompanied with an access size. Instead of the access size, the request may be accompanied with a period during which the shared memory 10 is used exclusively by a functional block (hereinafter, referred to as a memory use period). This period is generally calculated by using the number of clocks of the shared memory 10. In a case where the memory use period accompanying the access reservation request is long, permission of access by this access request keeps the other access requests wait for a long time. In view of this, for arbitration between access requests, the shared-circuit-use-arbitrating circuit 31 refers to the memory use period. In a case where a memory use period accompanying an access reservation request is long and a memory use period accompanying a subsequent usual or sporadic access request is short, the shared-circuit-use-arbitrating circuit 31 accepts the latter request preferentially, even if the former has a higher priority level. For a functional block, if the memory use period is a fixed period, information on the fixed period is held in a shared-circuit-use-arbitrating circuit 11 in advance.

The access reservation request may be accompanied with a method of using the shared memory 10 (hereinafter, referred to as a memory usage method), instead of the memory use period. The memory usage method is used to determine whether access to be performed is read access or write access. Accordingly, when accepting an access reservation request from a functional block, the shared-circuit-use-arbitrating circuit 31 compares a memory usage method accompanying this access reservation request and a memory usage method accompanying a usual or sporadic access request from another functional block. If these requests are both for either read access or write access, arbitration is performed such that a usual access request issued immediately after the current access reservation request and a usual or sporadic access request from another functional block are successive. With such arbitration, read access or write access to the shared memory 10 are performed successively, resulting in high efficiency in using the shared memory 10, as compared to the case where read access and write access are alternatively performed.

Embodiment 4

Hereinafter, an arbitration circuit according to a fourth embodiment of the present invention will be described.

Figure 5:
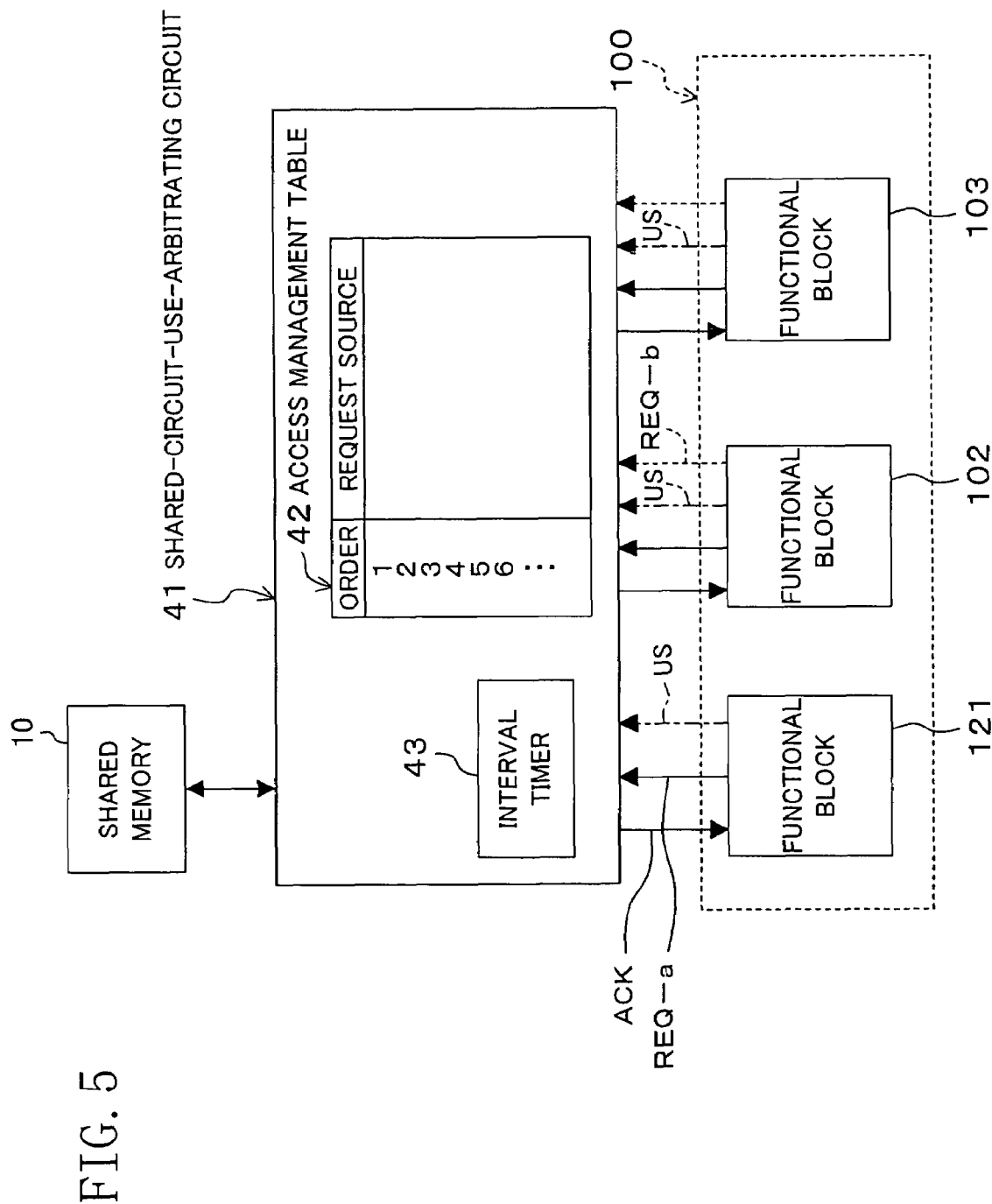
FIG. 5 is a diagram showing a configuration of an arbitration circuit according to a fourth embodiment of the present invention.

As shown in FIG. 5, in a case of providing a functional block 121 whose access frequency and access interval are predetermined to some extent, the functional block 121 does not necessarily issue an access reservation request for every access. If an interval timer (automatic reservation issuing circuit) 43 is provided in a shared-circuit-use-arbitrating circuit 41 so as to periodically issue access reservation requests, the functional block 121 does not need to issue an access reservation request by itself. In that case, for the shared-circuit-use-arbitrating circuit 41, the access frequency and the access interval are clear, so that the priority level of access through the interval timer 43 is lowered in a period after access through the interval timer 43 and before the next access request through the interval timer 43. Accordingly, during the period, access from another functional block is permitted preferentially. When an access request is reserved by the interval timer 43, the priority level is raised in preparation for an actual access request.

Embodiment 5

Hereinafter, an arbitration circuit according to a fifth embodiment of the present invention will be described.

For some access requests, the average number of accesses and the amount of data used in access during a given period are predetermined though these requests are not periodically issued. In such cases, the lower the access frequency is, the higher the priority level of the next access request is. In the case of a high access frequency, there may arise no problems even if the priority level of a request from a functional block is lowered to permit access from another functional block preferentially. To implement such a case, the system needs to be designed in consideration of the case of high priority in a conventional technique.

Figure 6:
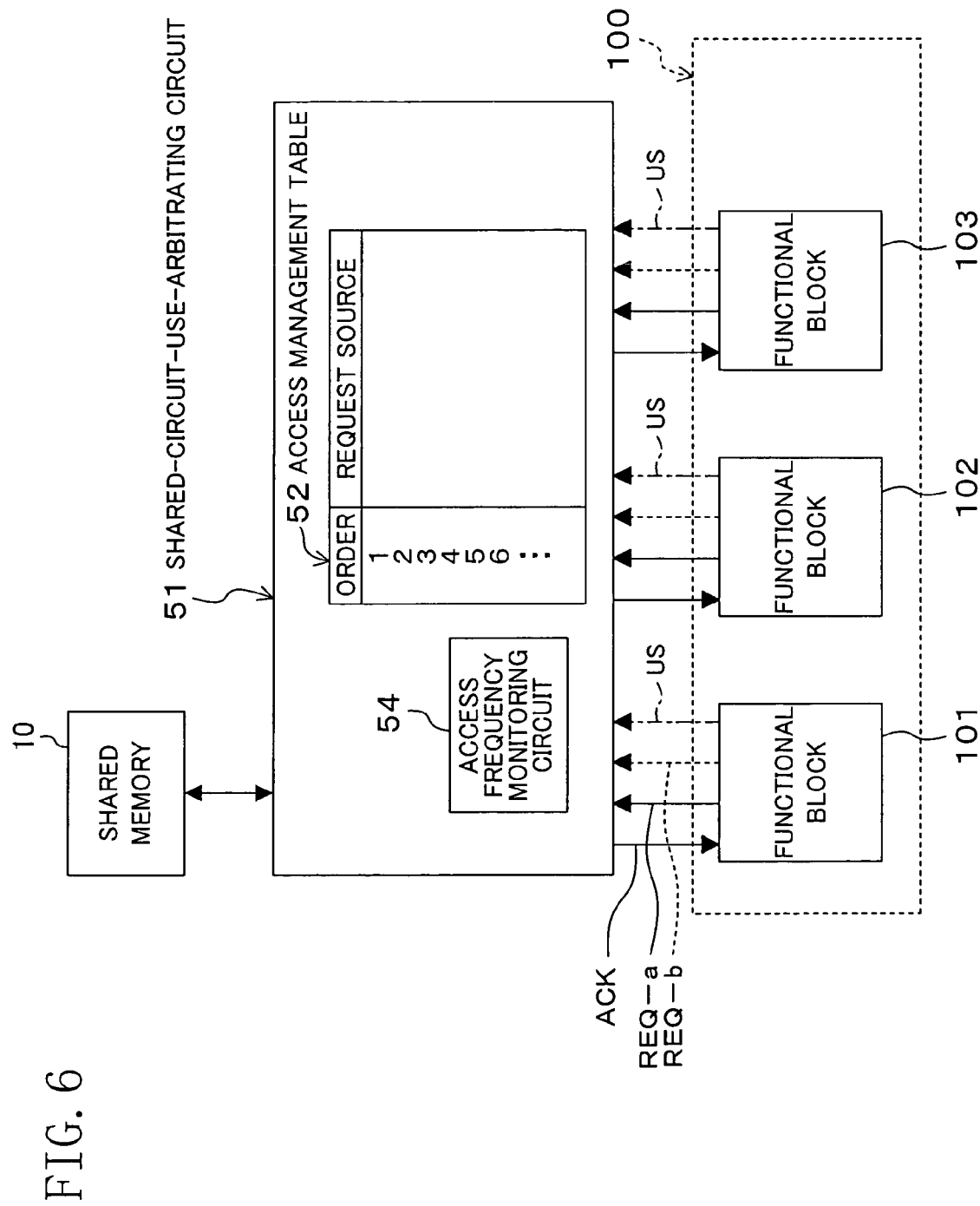
FIG. 6 is a diagram showing a configuration of an arbitration circuit according to a fifth embodiment of the present invention.

To cope with this necessity, according to this embodiment, an access frequency monitoring circuit (arbitration order changing circuit) 54 for monitoring the access frequency is introduced in a shared-circuit-use-arbitrating circuit 51 as shown in FIG. 6 so that if no access is requested in a predetermined period, the priority level of a request from a functional block is changed with time and the is gradually raised.

With this configuration, if the access frequency is high and the process is performed successfully, the priority level of a current request from a functional block is lowered. That is, even when the current access request overlaps another access request, this request may be accepted preferentially because access based on the current request has been successfully processed before the overlap. On the other hand, if no access request is issued during a predetermined period, a higher priority level is assigned to the next access request, thus ensuring the average number of accesses.

As described above, according to the present invention, in an arbitration circuit in which a plurality of functional blocks access to a shared circuit such as a shared memory, arbitration is efficiently performed on access requests issued at the same time from the functional blocks. Accordingly, the present invention is useful to such an arbitration circuit and the like.

What is claimed is:

1. An arbitration circuit, comprising:
a plurality of function processing circuits;
a shared circuit shared among the function processing circuits; and
a shared-circuit-use-arbitrating circuit,
wherein the shared circuit is used exclusively by one of the function processing circuits at a time,
each of the function processing circuits issues a usual use request to use the shared circuit and a use reservation request prior to the usual use request, and further issues a sporadic access request without issuing the use reservation request,
the shared-circuit-use-arbitrating circuit receives the usual use requests, the sporadic access requests, and the use reservation requests from the function processing circuits, arbitrates between a use reservation request from one of the function processing circuits and a sporadic access request from another function processing circuit, and preferentially allows either one of the usual use request to be issued after the use reservation request, and the sporadic access request, to use the shared circuit,
the shared-circuit-use-arbitrating circuit includes an automatic reservation issuing circuit for automatically issuing a use reservation request at established periods for one of the function processing circuits periodically using the shared circuit, and
after one of the function processing circuits has accessed the shared circuit, the shared-circuit-use-arbitrating circuit reduces a priority level of this function processing circuit which has accessed the shared circuit, and then, when an access request from this function processing circuit is reserved, the shared-circuit-use-arbitrating circuit increases the priority level of this function processing circuit.

2. The arbitration circuit of claim 1, wherein the shared-circuit-use-arbitrating circuit includes an information holding circuit for holding the use requests and the use reservation requests.

3. The arbitration circuit of claim 2, wherein the information holding circuit holds the use requests and the use reservation requests from the function processing circuits and a history of arbitration.

4. The arbitration circuit of claim 1, wherein each of the function processing circuits issuing the use reservation request has a function of issuing cancellation of the use reservation request to the shared-circuit-use-arbitrating circuit when the use reservation becomes unnecessary.

5. The arbitration circuit of claim 1, wherein the shared-circuit-use-arbitrating circuit includes a timer for measuring a period elapsed after the use reservation request has been accepted.

6. The arbitration circuit of claim 5, wherein if the period elapsed after the use reservation request has been accepted is longer than a predetermined period, the shared-circuit-use-arbitrating circuit cancels the use reservation request.

7. The arbitration circuit of claim 6, wherein the predetermined period from the issue of the use reservation request to the cancellation of the use reservation request is changeable.

8. The arbitration circuit of claim 1, wherein each of the function processing circuits issuing the use reservation request issues, to the shared-circuit-use-arbitrating circuit, information on at least one of a predetermined use time, a predetermined use period, a usage method and an amount of use with respect to the shared circuit, together with the use reservation request, and
the shared-circuit-use-arbitrating circuit performs arbitration based on the information from the function processing circuit issuing the use reservation request.

9. The arbitration circuit of claim 1, wherein when one of the function processing circuits sporadically issues the use request the shared-circuit-use-arbitrating circuit permits said one of the function processing circuits to use the shared circuit with limitations imposed on at least one of a function to be used, a usage method and a use period.

10. The arbitration circuit of claim 1, wherein the shared-circuit-use-arbitrating circuit includes an arbitration preference changing circuit for changing, with time, preference in arbitration for permitting the use of the shared circuit.

11. The arbitration circuit of claim 1, wherein each of the function processing circuits issues an urgent use request to the shared-circuit-use-arbitrating circuit when the function processing circuit needs to use the shared circuit immediately, and
when the shared-circuit-use-arbitrating circuit accepts the urgent use request from one of the function processing circuits, the shared-circuit-use-arbitrating circuit determines an order of using the shared circuit, a period during which the shared circuit is used and a function to be used for the shred circuit and notifies said one of the function processing circuits of the determined order, period and function.

12. The arbitration circuit of claim 1, wherein the shared circuit is a memory.

13. The arbitration circuit of claim 1, wherein each of the function processing circuits includes a state machine and issues the use reservation request when the state machine enters a state immediately before the issue of the use request.

14. The arbitration circuit of claim 1, wherein at least one of the function processing circuits includes a data buffer and has a function of outputting data from the data buffer, and
the function processing circuit having the function of outputting data issues the use reservation request immediately before the data stored in the data buffer reaches a maximum.

15. The arbitration circuit of claim 1, wherein at least one of the function processing circuits includes a data buffer and has a function of inputting data to the data buffer from the outside, and
the function processing circuit having the function of inputting data issues the use reservation request immediately before all the data stored in the data buffer is output.

16. A function processing circuit, which is included in a plurality of function processing circuits using a shared circuit and a shared-circuit-use-arbitrating circuit, the shared circuit being used exclusively by one of the function processing circuits at a time, wherein:
each of the function processing circuits issues a usual use request to use the shared circuit and a use reservation request prior to the usual use request, and further issues a sporadic access request without issuing the use reservation request,
the shared-circuit-use arbitrating circuit receives the usual use requests, the sporadic access requests, and the use reservation requests from the function processing circuits, arbitrates between a use reservation request from one of the function processing circuits and a sporadic access request from another function processing circuit, and preferentially allows either one of the usual use request to be issued after the use reservation request, and the sporadic access request, to use the shared circuit,
the shared-circuit-use-arbitrating circuit includes an automatic reservation issuing circuit for automatically issuing a use reservation request at established periods for one of the function processing circuits periodically using the shared circuit, and
after one of the function processing circuits has accessed the shared circuit, the shared-circuit-use-arbitrating circuit reduces a priority level of this function processing circuit which has accessed the shared circuit, and then, when an access request from this function processing circuit is reserved, the shared-circuit-use-arbitrating circuit increases the priority level of this function processing circuit.

17. The function processing circuit of claim 16, comprising a state machine therein,
wherein the function processing circuit issues the use reservation request when the state machine enters a state immediately before the issue of the use request.

18. The function processing circuit of claim 16, comprising a data buffer therein,
wherein the function processing circuit has a function of outputting data from the data buffer, and
the function processing circuit issues the use reservation request immediately before the data stored in the data buffer reaches a maximum.

19. The function processing circuit of claim 16, comprising a data buffer therein,
wherein the function processing circuit has a function of inputting data to the data buffer from the outside, and
the function processing circuit issues the use reservation request immediately before all the data stored in the data buffer is output.

* * * * *

UNITED STATES PATENT AND TRADEMARK OFFICE
CERTIFICATE OF CORRECTION

| | | |
|---|---|---|
| PATENT NO. | : 7,657,681 B2 | Page 1 of 1 |
| APPLICATION NO. | : 10/979223 | |
| DATED | : February 2, 2010 | |
| INVENTOR(S) | : Tanaka | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1144 days.

Signed and Sealed this
Eighth Day of February, 2011

David J. Kappos
*Director of the United States Patent and Trademark Office*